April 17, 1956   L. C. A. VAN STAALDUINEN   2,741,875
SET OF TRANSPLANTING POTS
Filed April 17, 1951
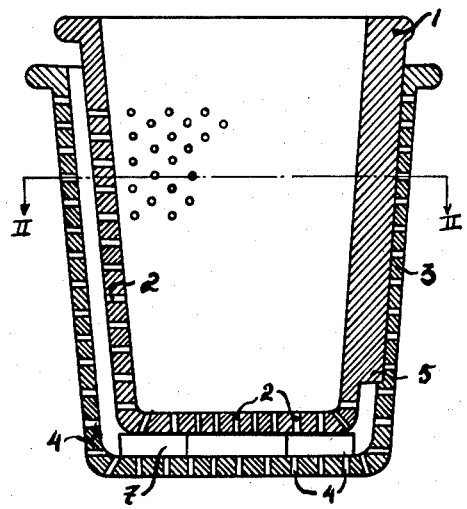
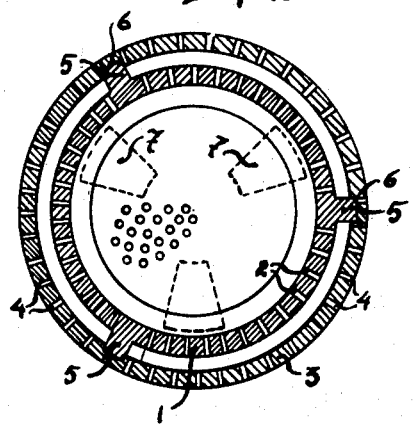
INVENTOR:
Leendert Cornelis Adrianus van
BY                    Staalduinen,
His Agent.

United States Patent Office 2,741,875
Patented Apr. 17, 1956

2,741,875

SET OF TRANSPLANTING POTS

Leendert Cornelis Adrianus van Staalduinen,
The Hague, Netherlands

Application April 17, 1951, Serial No. 221,438

4 Claims. (Cl. 47—38)

One of the great drawbacks connected with the so-called pre-forcing of early plants in transplanting-pots is the arrest of growth when these plants are repotted or are transplanted in the full ground in hot-beds or greenhouses.

As will be known, in the early spring some plants are sowed and pre-forced in specially heated hot-beds or greenhouses. The meaning of same is to put these plants early on the market, so that a high price can be obtained.

When applying natural heating means usually hot-beds and in case of heating installations pre-forcing hot-houses or a part of a greenhouse being specially fitted up for this purpose are used.

In case of space heating and under special circumstances also by ground heating by means of mechanical means much fuel is used, especially in the cold spring. The heat, particularly by space heating, penetrates generally very difficult into the ground. Further there must be heated very much during a long period, which often has harmful consequences, as the difference of temperature under and above the ground may be comparatively large, whereas the fuel consumption is very high.

After some time it is necessary to transplant the small plants in pots or in the full ground, whereby owing to damage of the roots or owing to rather large differences in temperature an arrest of growth presents itself, which arrest may vary from seven to fourteen days.

However, there is still another factor playing a great part, namely the supply of food-stuffs, water and under special circumstances destruction means to the roots of the plants.

Normally the same takes place by providing said matters on the ground, so that it takes some time before the same can reach the roots. It may be necessary to bring said matters directly near the roots, which is not possible with the known pots.

The invention aims at avoiding said drawbacks and also at creating the said favourable conditions, in order to obtain an early and completely satisfactory product.

According to the invention a set of transplanting pots is applied, which pots fit into each other with some clearance, and which pots are perforated at their surface and in the bottom, whereas the inner pot reaches over some distance above the outer pot.

The outer pot is then placed in the ground and is surrounded with earth, whereas the inner pot is placed inside the outer pot.

The great advantage is, that the temperature prevailing at the root-system may thereby be rendered equal or nearly equal to that above the ground, as there is a space between the inner and outer pot, which is in open connection with the space above the ground. The supplying of water, food-stuffs or destruction means can take place directly near the root-system. In case of space heating the hot and moist air can directly reach the roots, as said air can enter into the space between the pots.

An efficient construction is that whereby the inner pot has projections at its outer surface, which projections support against the inner surface of the outer pot. In this way there will always be a space between the two pots, when same have been placed into each other.

After some time the roots will grow through the perforations and enter into the space between the pots. Owing to this the roots are always easily admissible.

As there is always a layer of air between the pots, there is no direct contact between the full ground and the ground in the inner pot, so that the difference of temperature between the roots and the plant can be nil. This is very important, as a difference of temperatures between the plant proper and the root-system thereof has an adverse influence on the growth. When the roots have a higher temperature than the plant, the plant will easily sprout out, in consequence of which inferior fruits are obtained. When on the contrary the root-system has a lower temperature than the plant, the growth will be delayed.

Especially in spring, when the ground has a low temperature, an enormous savings of fuel can be obtained by applying the invention, as the heat can directly enter into the ground near the root-system and the whole surface of the ground needs not to be preheated.

By artificial underground heating the heat coming out of the ground will skim the surface of the ground and influence the plant as well as the roots directly.

As when transplanting the plants the roots are not damaged and differences of temperature will practically not occur, there will hardly arise any question of an arrest of growth, so that the plants will earlier bear fruits.

The inner pot can easily be removed out of the outer pot, as same reaches over some distance above the outer pot.

In the accompanying drawing the invention will be illustrated and more precisely described underneath.

In the drawing:

Fig. 1 is a longitudinal sectional view of a set of nursery pots according to the invention and Fig. 2 is a sectional view taken on the line II—II of Fig. 1.

According to the invention the inner pot 1 has perforations 2, which are provided over the whole surface and also in the bottom of the pot. The outer pot 3 has also perforations 4. In inner pot 1 has projections 5, which can cooperate with recesses 6 of the outer pot. In this manner a good support is obtained and turning of the inner pot with respect to the outer pot will not be possible. When the roots have entered the space between the two pots, these roots can never be damaged in consequence of mutual rotation of the pots. When the set of pots according to the invention have been placed in the full ground, the roots can also go through the perforations of the outer pot and therefore directly come in contact with this ground. This is not objectionable, as the ground has a temperature, which differs less from that in the inner pot or in the space between the pots.

The inner pot 1 reaches over some distance above the outer pot 3, so that same can easily be seized, when the inner pot has to be removed from the outer pot.

The supply of water, food-stuffs and if necessary of destruction means for root-disease, can take place in the room between pot 1 and pot 3, when same are placed into each other.

It is also possible to provide projections 7 at the bottom of the pot 1, so that the inner pot will also be supported on the bottom. These supports 7 are not necessary, as the grooves 6 can be performed in such a manner, that the bottom of the pot 1 can never touch the bottom of the pot 3.

I claim:

1. In a set of transplanting pots, a tapered outer pot designed to be placed into and to be removed out of the ground and including a bottom wall and a side wall and having perforations throughout all of said walls, an inner pot removably suspended in said outer pot and including a bottom wall section and a side wall section and having perforations throughout said sections, the perforations of the outer pot being near those of the inner pot; a chamber formed between the inner surface of said outer pot and the outer surface of said inner pot and being through the perforations in said walls and said sections in intercommunication with the ground surrounding said outer pot and the earth holding a plant in the inner pot and accessible from above ground, and means intermediate said pots operable for removably suspending the inner pot in said outer pot spaced from the bottom and side walls thereof.

2. In a set of transplanting pots, as claimed in claim 1, said perforations being sufficiently large to pass plant roots extending from the interior of said inner pot.

3. In a set of transplanting pots, a tapered outer pot designed to be placed into and to be lifted out of the ground and including a bottom wall and a side wall, an inner pot removably suspended in said outer pot spaced above the base thereof and including a bottom wall and a side wall, the external surface of said inner pot being spaced throughout from the internal surface of said outer pot, said walls having throughout perforations perpendicular to the longitudinal extension of each wall providing intercommunication between the interior of said inner pot, the interpot space and the ground surrounding said outer pot, and means intermediate said pots operable for suspending the inner pot in the outer pot separating the pots for the interpot space.

4. In a set of transplanting pots, as claimed in claim 3, said inner pot having an external rim near the top of the side wall thereof and extending with said rim above the top of said outer pot, for manually grasping for removal.

References Cited in the file of this patent

UNITED STATES PATENTS

| | | |
|---|---|---|
| 954,440 | Klemm | Apr. 12, 1910 |
| 2,344,794 | Vallinos | Mar. 21, 1944 |
| 2,387,340 | Moriarty | Oct. 23, 1945 |
| 2,496,758 | Tingley | Feb. 7, 1950 |

FOREIGN PATENTS

| | | |
|---|---|---|
| 474,576 | Germany | Apr. 2, 1929 |
| 633,741 | Germany | Aug. 5, 1936 |
| 17,940 | Great Britain | 1904 |
| 788,028 | France | July 22, 1935 |